J. C. HAEFELE.
Meat Cutter.

No. 68,068. Patented Aug. 27, 1867.

Witnesses

Inventor

United States Patent Office.

JOHN C. HAEFELE, OF NEW YORK, N. Y.

Letters Patent No. 68,068, dated August 27, 1867.

---

IMPROVED MEAT-CUTTER.

---

The Schedule referred to in these Letters Patent and making part of the same.

---

TO WHOM IT MAY CONCERN:

Be it known that I, JOHN C. HAEFELE, of New York, in the county and State of New York, have invented certain new and useful improvements in Machines for Cutting Meat and other articles; and I hereby declare the following to be a full, clear, and exact description of the same, reference being had to the accompanying drawings, in which—

My invention consists primarily in the employment, in a machine for cutting meat, vegetables, and other substances, of one or more cutters, of segmental or other suitable curved shape, having a rocking motion.

In ordinary meat-cutting machines the knives have either a vertical or a swinging movement. In both cases, however, there is a chopping up-and-down motion, the contact of the blades with the substance to be cut being intermittent, and not continuous. The motion is entirely distinct and different from the rocking motion which it is my object to impart to the cutters. Under my invention the cutter is a curved knife or blade which rocks or rolls upon its edge from one side to the other of the tub or platform on which it rests, thus bringing every part of the blade or edge in contact with the meat or other substance to be cut.

In practice I have found it best to combine a series of these rocker-knives, say from four to six, united together at their ends by tie-bolts, and connected with a system of levers through which they receive a reciprocating rocking motion, as above described. To facilitate the working of the cutters, I place them between parallel guides which are recessed so as to receive the projecting ends of the tie-bolts, which bind the knives together, and to form the pivotal points upon which, at each stroke, the cutters turn.

I combine with the cutters a rotary tub or platform, which is toothed around its lower part so as to gear with a pinion receiving motion from a ratchet actuated by one or more pawls. A reciprocating movement is given the pawls by means of a cam formed on the main shaft of the machine, which, when the shaft revolves, causes the alternate backward and forward movement of the pawls, and consequent rotation of the ratchet-wheel, pinion, and tub or block. This rotating mechanism is arranged to have its movement bear such relation to that of the mechanism which actuates the cutters, that the rotary movement of the block or tub shall take place only during the intervals between the strokes of the cutters, so that during the time the cutters are passing over the surface of the tub the latter shall be stationary and immovable.

In order to maintain the tub upright and in proper position under the knives during its rotation, I support it by means of friction-rollers which extend out from the main frame of the machine so as to be in contact with the block.

To enable others skilled in the art to understand and use my invention, I will now proceed to describe the manner in which the same is or may be carried into effect, by reference to the accompanying drawings.

Figure 1:
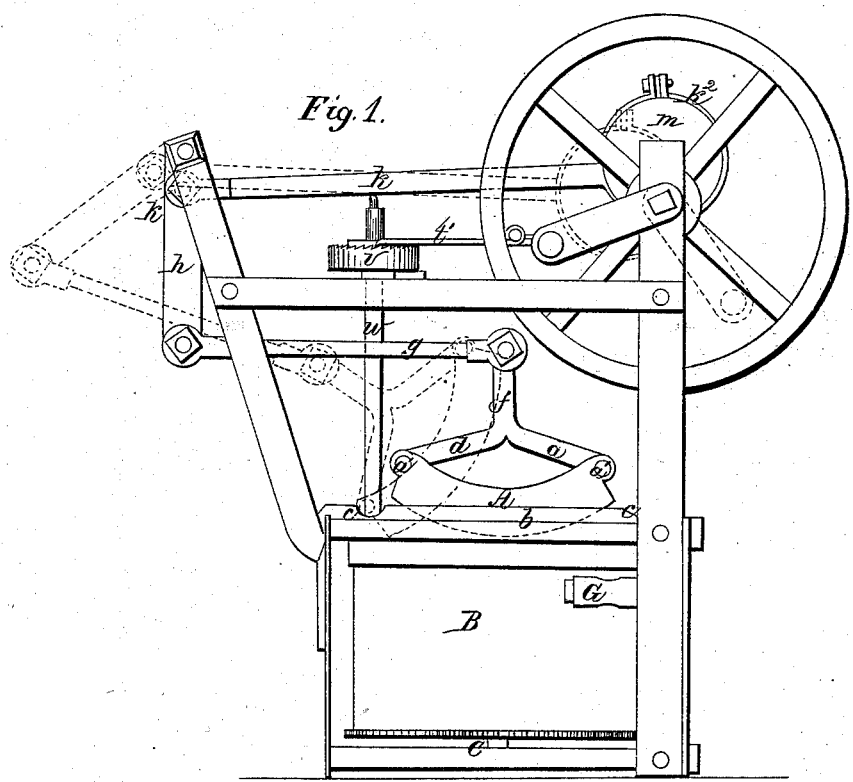
Figure 1 is an elevation.
Figure 2:
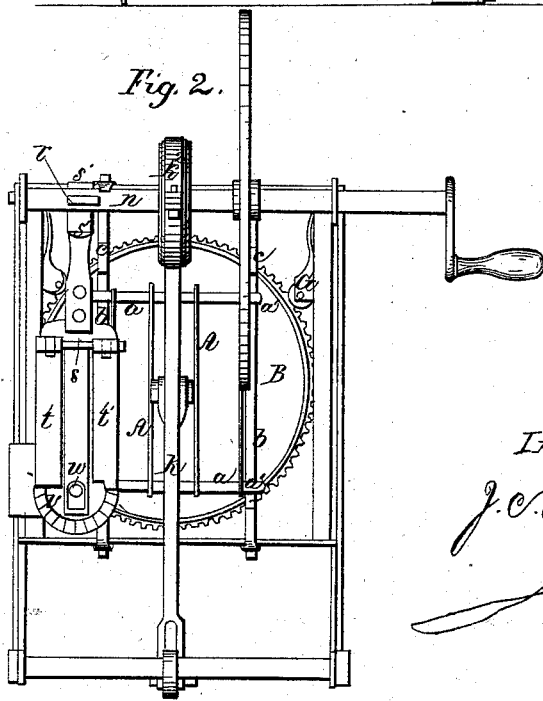
Figure 2 is a plan view of a meat-cutting machine constructed in accordance with my invention.

The cutters A, which are there represented, consist of blades having a segmental or curved form. They are united together at each end by means of tie-bolts or rods $a$, upon which they are secured at suitable intervals apart, and so as to be parallel with one another. The movement of this gang or series of cutters is directed by means of guides $b$, which are placed on each side of the gang above the top of the tub or platform B, on which the meat or other substance is placed. In the top of and near the opposite ends of each guide, recesses $c$ are formed, which receive the projecting ends $a'$ of the rods or bolts $a$, near the end of each stroke of the knives, and form the pivotal points upon which the cutters turn, and the means by which they are prevented from sliding too far in one direction or the other. The cutting edges of the knives rest upon the tub or platform B, which has teeth formed around its lower part for the purpose of engaging with gearing by means of which the tub is revolved on its centre or axis C. Arms $d$ extend from each end of the cutter, meeting or forming part of the upright piece or rod $f$, which is located at a point midway between the ends of the cutter, for the purposes hereinbefore mentioned. This rod is connected at its upper end, and really forms part of a system of levers, $g\ h$, for actuating the cutters and giving them a reciprocating movement, the latter lever being connected, by means of rod K, with an eccentric, $m$, mounted on the main or driving shaft of the machine. The arrangement of these levers to each other is such that when the middle point of the cutter is in contact with the tub, as shown in fig. 2, each lever will be at right angles or nearly so with its neighbor. By this arrangement of levers the knives are operated to the best advantage, and the movement of the gang of cutters is similar to that which it would be were the cutters and their handle detached from the rest of the machine, and worked by hand. The lever $h$ is mounted upon and hangs from a rod, $p$, secured in the stationary frame of the machine. The lower end of this lever is hinged to the lever $g$, which in its turn is hinged or jointed to the arm $f$. The rod K, which communicates the reciprocating motion, has one of its ends attached to the lever $h$ at $K^1$, and its opposite end is held upon the eccentric $m$ by means of a loose strap or band, $K^2$. The eccentric revolves with the shaft upon which it is placed, and causes the rod K to move to and fro, thus actuating the lever to produce the reciprocating rocking motion of the cutters. The feed or rotary movement of the tub B is produced by means of a cam, $r$, on the shaft $n$, which, when the shaft revolves, strikes alternately the front and rear jaws $S'$ of a bar or plate, S, supported on a vibrating arm pivoted to the main frame of the machine. The front part of the plate supports two pawls $t\ t'$, which engage with a ratchet-wheel, V, mounted on an upright shaft, W, the lower end of which carries a pinion, which gears with the teeth formed around the lower part of the tub B. The front end of the plate S is slotted and fits over the head of the shaft W, so that the plate during its reciprocating movement is thus guided and held in place, maintaining in their proper positions the pawls $t\ t'$, which engage with the ratchet, one on each side of the centre shaft W. The pawl $t$ has a hook formed on it, and so as to engage with the ratchet during the backward movement of the sliding plate S, and to ride over the teeth during the forward movement of the same. The pawl $t'$ on the other side of the shaft is differently formed, as shown in fig. 1, so that its action shall be the reverse of the other pawl, $i.\ e.$, so as to engage with and push the ratchet during the forward movement, and to ride over its teeth during the backward movement. The two pawls thus engage with the ratchet alternately, the pawl $t$ actuating the ratchet, while the pawl $t'$ is being moved into its proper position for engaging the same, and *vice versa*. As above intimated, the arrangement of the cam, jawed reciprocating plate, and pawls is such that the ratchet and its shaft, and consequently the block B, are rotated only in the intervals between the stroke of the cutters, $i.\ e.$, when the cutters occupy the position shown in red lines in fig. 2; and before they begin to move on the return stroke the block is turned, so as to present another portion of the meat or other substance to the action of the cutters. The shaft $n$ has its bearings in the main frame, and is operated by a crank and handle, or by other suitable means. In order to steady the tub during its rotation, and to support it under the action of the knives, friction-rollers G are placed in the sides of the frame around the tub, as shown plainly in the drawings.

The operation of the cutter and other parts of the machine will be readily understood without a detailed description. When the shaft $n$ is revolved the handle or rod $f$ is vibrated or oscillated, thus causing the knives A to rock upon their curved edges, moving between the guides $b$. When the cutters approach the end of their stroke in either direction, the ends $a'$ of the connecting-rods $a$ are received in the recesses $c$ of the guides $b$, as shown in fig. 1, and thus constitute the pivotal points on which they turn, and the means by which the sliding movement of the cutters is limited and stopped.

During the movement of the knives the cam $r$ on the main shaft causes the reciprocating movement of the plate S, as above explained, and consequently the alternate forward and backward movement of the pawls, which, as hereinbefore described, effects the rotation of the ratchet V and shaft W, during the intervals between the stroke of the cutters. The pinion on the lower end of the shaft, which gears with the toothed rim of the tub or block B, causes the movement of the latter, which is thus slowly rotated so as to subject every portion of the meat or other substance to the action of the cutters.

Having described my invention, and the manner in which the same is or may be carried into effect, what I claim, and desire to secure by Letters Patent, is as follows:

1. In a meat-cutter such as described, the method of pivoting or hinging the system of levers to the knives, at a point vertically above the said knives, and equidistant or thereabouts from the ends of the same, as and for the purposes described.

2. The combination, with one or more segmental knives, of a system of levers pivoted to the said knives, at a central point vertically above the same, and hung in the frame of the machine in such manner that the levers immediately connected with the knives shall be parallel or nearly so with the surface of the block over which they move, as and for the purposes herein shown and set forth.

3. The combination, with the vibratory and rocking cutters, of the lateral guides for maintaining the said cutters in the same plane while in operation, as herein shown and described.

4. The combination, with the vibratory cutters, their actuating mechanism, and lateral guides, arranged and operating as herein described, of a tub or block revolving on its centre, substantially in the manner and for the purposes shown and specified.

5. The combination with the vibratory cutters of the guides provided with recesses forming the pivotal points upon which the cutters turn at the end of each stroke, as and for the purposes set forth.

6. In a meat-cutter in which the cutters are of segmental form and operate as described, I claim the combination, with the cutters and tub or block, of mechanism for vibrating the said cutters, and rotating the said block in the manner described, so that the tub shall be rotated during the interval between the vibrations or strokes of the cutters, as and for the purposes set forth.

7. The combination of the jawed reciprocating plate, and vibrating arm upon which it is mounted, with the shaft and cam for actuating the said plate, substantially in the manner and for the purposes described.

8. The combination of the reciprocating plate and pawls, and the ratchet and pinion, operating together, as described, with the meat-tub or block, under the arrangement herein shown and specified.

In testimony whereof I have signed my name to this specification before two subscribing witnesses.

JOHN C. HAEFELE.

Witnesses:
JOHN JOHNSON,
PHILIPP RENK.